G. B. AMBLER.
CHILD'S CARRIAGE.
APPLICATION FILED NOV. 9, 1911.

1,117,149.

Patented Nov. 17, 1914.

3 SHEETS—SHEET 1.

Witnesses:
Carl L. Choate.
Horace A. Crossman

Inventor:
George B. Ambler,
by Emery, Booth, Janney & Varney
Attys.

G. B. AMBLER.
CHILD'S CARRIAGE.
APPLICATION FILED NOV. 9, 1911.

1,117,149.

Patented Nov. 17, 1914.
3 SHEETS—SHEET 2.

Witnesses:
Carl L. Choate.
Horace A. Crossman

Inventor:
George B. Ambler,
by Emery, Booth, Janney & Varney
Attys.

G. B. AMBLER.
CHILD'S CARRIAGE.
APPLICATION FILED NOV. 9, 1911.

1,117,149.

Patented Nov. 17, 1914.

3 SHEETS—SHEET 3.

Witnesses:
Carl L. Choate.
Horace A. Crossman

Inventor:
George B. Ambler.
by Emery, Booth, Janney & Varney
Attys.

UNITED STATES PATENT OFFICE.

GEORGE B. AMBLER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

CHILD'S CARRIAGE.

1,117,149. Specification of Letters Patent. Patented Nov. 17, 1914.

Application filed November 9, 1911. Serial No. 659,316.

*To all whom it may concern:*

Be it known that I, GEORGE B. AMBLER, a citizen of the United States, and a resident of Leominster, county of Worcester, and State of Massachusetts, have invented an Improvement in Children's Carriages, of which the following description, in connection with the accompanying drawings, is a specification, like characters on the drawings representing like parts.

This invention relates to folding or collapsing children's vehicles and the like and pertains to various improvements in the construction, organization and mode of operation.

Among other objects the invention is intended to provide a vehicle of very light construction having few and simple parts in a simple organization, which, at the same time, shall be strong and durable and shall support the occupant comfortably and upon adequately yielding springs.

Figure 1:
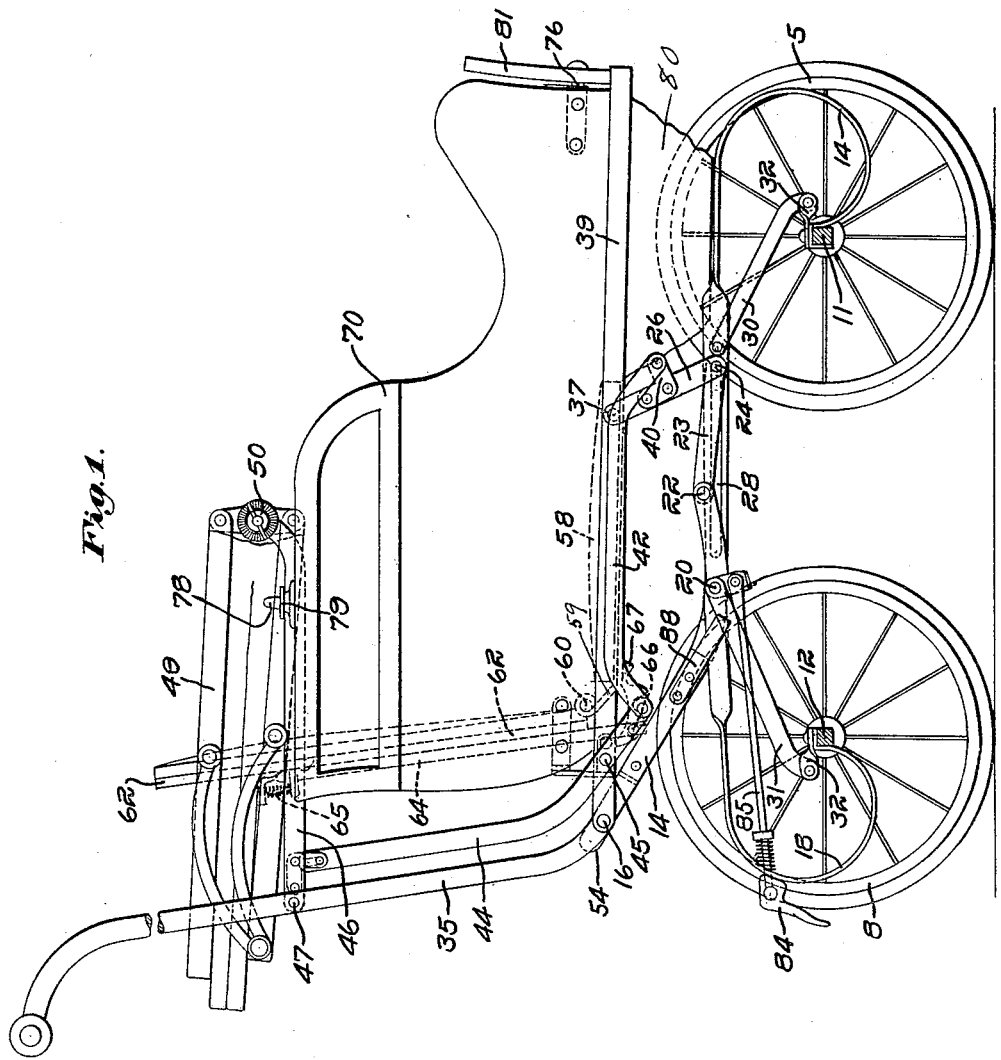
Figure 2:
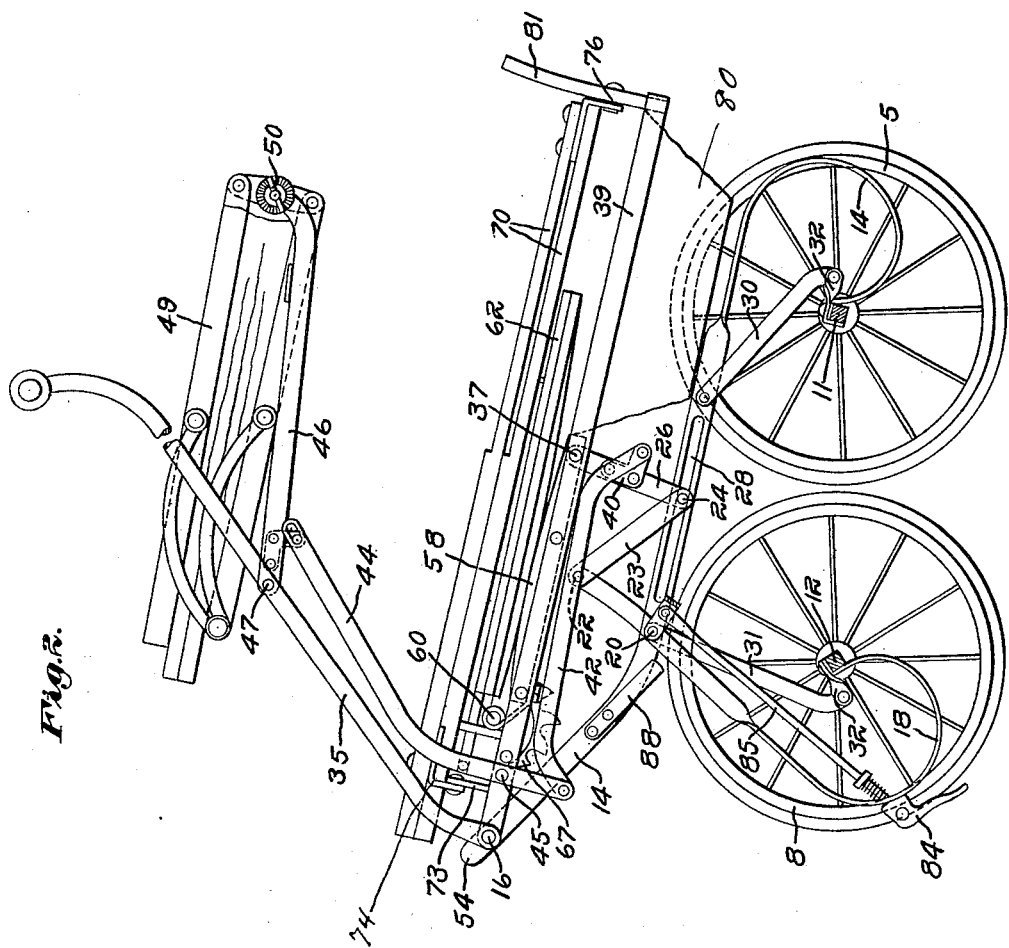
Figure 5:
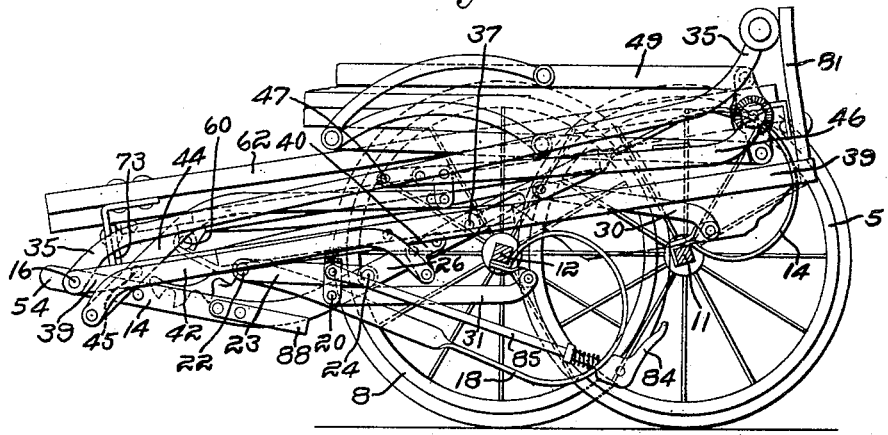
Figure 4:
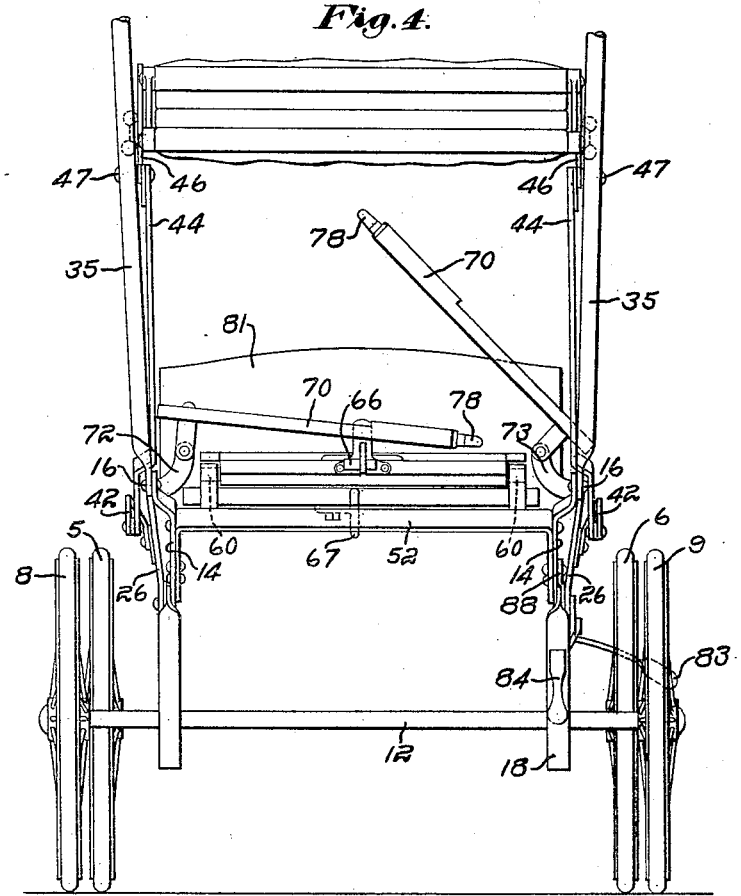

The character of the invention may be readily understood by reference to one practicable embodiment thereof shown by way of illustration in the accompanying drawings, in which:

Figure 1 is a side elevation of the illustrative embodiment in erected position, the running gear being shown in section; Fig. 2 is a side elevation of the same embodiment in partly folded or collapsed position; Fig. 3 is a side elevation of the same embodiment in completely folded or collapsed position; and Fig. 4 is a rear elevation of the same, erected and as viewed from the left in Fig. 1.

The illustrative vehicle comprises front wheels 5, 6, and rear wheels 8 and 9. Preferably, for the sake of rigidity and strength, the front wheels 5, 6 are mounted upon a common integral axle 11; and the rear wheels are preferably mounted upon a common integral axle 12.

The axle 11 is appropriately mounted in the lower end of a frame piece 14 (duplicated at opposite sides of the vehicle). These frame pieces are preferably bent to supply supporting springs. As shown in Fig. 1, the frame piece 14 consists of a preferably metal bar or strip extending from the front axle 11 along the spring bend and thence rearwardly toward the rear end of the vehicle to a pivot 16 upon which the frame piece 14 is adapted to oscillate in relation to other parts as presently described.

The rear axle 12 is mounted in frame piece 18 preferably bent to provide spring supports. Each frame piece 18 is pivoted at 20 to the adjacent frame piece 14 carrying the front axle; and beyond said pivot 20 (toward the right in Fig. 1) each frame piece 18 has an extension carrying a pin 22 connected by a link 23 to a pin 24 upon the lower end of a lever 26. The pin 24 projects into a guide slot 28 in the frame piece 14.

Each frame piece 14 may be reinforced by a strut 30 suitably connecting separated parts of the frame piece, and, in like manner, the frame piece 18 may be reinforced by a similar strut 31. Struts 30 and 31 perform, in the specific organization shown, substantially the functions of a reach, maintaining, or contributing to maintain, the wheels in proper relationship. The lower end of each strut is pivoted to a bracket 32 which, in turn, is bolted to the adjacent axle. Thus, the lower end of each strut is offset somewhat from the axis upon which the adjacent wheel revolves; and with this arrangement the thrust transmitted through the strut is applied at a point somewhat removed from the wheel axis and is applied to a part which can yield or swing upon the wheel axis. By such an organization or its equivalent, the spring of each frame piece 14 or 18 is adequately reinforced but is permitted to yield in the performance of its spring function, and the lower end of each strut likewise yields for the same purpose.

The illustrative lever 26 is fulcrumed at 37 upon a bar 39 which extends from the front of the vehicle to the pivot 16. The illustrative bar 39 may constitute one of the legs of a U-shaped horizontally disposed frame member the cross piece of which extends across the front end of the vehicle.

The handle bar 35 is pivoted at its lower end to the pivot 16 already referred to, upon which the frame member 14 and the side bar 39 are both likewise pivoted.

The lever 26 carries a laterally projecting lug 40 the outer extremity of which is connected by a link 42 with the lower end of a lever 44 pivoted at 45 to the side bar 39. The lever 44 projects upwardly, substantially paralleling the handle bar 35, and is connected at its upper extremity by a pin-andslot connection with a horizontally extending arm 46 which is also pivoted at 47 to the handle bar 35.

All of the described parts are preferably duplicated on opposite sides of the vehicle. The bar 46 preferably extends far enough toward the right in Fig. 1 to support at an appropriate point, an adjustable hood 49 which, for illustration, is shown as pivoted by a pin 50 to the end of the arm 46.

Referring now to Fig. 4, the frame pieces 14 are connected by a cross brace 52 which contributes rigidity to the construction of the vehicle and holds the frame pieces properly spaced apart. For further rigidity, each frame piece 14 is provided with an extension 54 (at the left in Fig. 1) which as shown in Fig. 4 fits snugly against and bears upon the adjacent parts of the lower ends of the handle bars 35, thereby assisting further to stiffen the construction and to transmit to the handle bars in the vicinity of the pivot 16, the bracing effect of the brace 52. The side bars 39 support connecting transverse bars which support a seat 58. Upon the rear end of the seat are secured hinge brackets 59, 59, to which are hinged at 60 a back 62. As shown in dotted lines in Fig. 1, the vertically slidable bar 64 is mounted in brackets on the rear side of the back 62 and is normally pressed upwardly by a spring 65. The bar 64 carries at its lower extremity a pin 66 which is adapted to engage alternatively, a series of seats or notches in a bracket 67 carried on the bottom of the seat 58. The engagement of the pin 66 with one or another of said notches serves to hold the back in adjusted position; and by pressing the bar 64 downwardly, the pin 66 is disengaged from the notch which it occupies permitting the back 62 to be swung (toward the right in Fig. 1) on its hinge 60, down onto the seat 58.

The specific illustrative type of vehicle comprises sides 70, 70, which are preferably arranged to be folded over on top of the folded back 62 as illustrated in the case of the side 70 shown inclined in Fig. 4. To suit this purpose, brackets 72, 73 are secured to the side pieces 39, 39 respectively and project upwardly to support hinges 74, 74 at the rear ends of the sides 70 and 70 respectively. The front ends of the sides are similarly supported on hinges 76. The hinges 74, 74 and 76 are preferably located in some such manner as that shown in the drawings (see Fig. 4) so as to permit the sides 70 and 70 to be folded in succession into substantially horizontal positions, one on top of the other, over and snugly adjacent to the folded back 62. Each of the sides 70 and 70 carries a button 78 adapted to be engaged by a metallic lug 79 fixed upon an arm 46 as shown in Fig. 1. Thus, when the vehicle is erected as shown in Fig. 1, the button 78 is engaged by the lug 79 on the arm 46, and thereby the sides 70 and 70 are held in erected position and at the same time the handle bars 35 are held against being rocked toward the right in Fig. 1 as is necessary, in the specific instance described, when collapsing the running gear.

The vehicle may be provided with a seat well 80 and dash 81. Also a brake may be conveniently provided by having a brake shoe 83 pivoted to the common pivot of the frame pieces 14 and 18 at 20 and connecting said brake shoe 83 to a foot lever 84 by means of a spring-controlled link 85.

Fig. 1 shows the illustrative vehicle in erected position wherein the frame piece 18 for the rear axle, is engaged by a clip 88 fixed upon the frame piece 14 for the front axle, said clip serving as a stop to prevent movement of the frame piece 18 clockwise relative to the pivot 20. Said clip 88 also preferably embraces the frame piece 18 against movement transversely of the vehicle and thereby contributes to prevent improper transverse movement of the wheels on their illustrative common axle, and tends otherwise to strengthen and increase the rigidity of the vehicle.

When it is desired to collapse the vehicle, the back 62 may be folded down against the seat as described; and the lug 79 may be dis-engaged from the pin 78 by rocking the arms 46 contraclockwise in Fig. 1 on their pivots 47, the pin-and-slot connection between said arms 46 and the levers 44 readily permitting this rocking movement. When the button has been thus dis-engaged, the sides 70 and 70 may be rocked down against the folded back 62 in the manner indicated in Fig. 4. When the back and sides are thus folded, the arms 46 preferably carrying the hood 49 are nevertheless held in erected position by the lever 44 and handle bars 35. This is of substantial advantage since the hood is supported and controlled so as to be dropped gradually toward the body of the vehicle as it is collapsed.

In the further collapsing of the vehicle, the handle bars 35 are swung clockwise in Fig. 1 about the pivot 16; it is convenient to start this collapsing movement by placing the foot on the axle 12 and simultaneously pulling upwardly on the handle bars and pressing them toward the right in Fig. 1. As the handles swing clockwise, the lever 44 is likewise rocked in the same direction about the pivot 45 so that the link 42 rocks the lever 26 toward the left. This, in turn, pushes the link 23 toward the left in Fig. 1 and rocks the frame piece 18 carrying the rear wheels, contraclockwise about the pivot 20 which connects the frame pieces 18 and 14. This movement of the frame piece 18 swings the latter downwardly and away from the clip 88. As the lever 26 swings toward the left (see Fig. 2) its pin 24 travels in the slot 28 of the frame piece 14, and ultimately, (after the collapsing has passed through the condition shown in Fig. 2) this operation folds the side pieces 39 of the body, and the frame piece 14, together, rocking both of them about the pivot 16, the bars 39 moving in a clockwise direction on that pivot, and the frame piece 14 moving contraclockwise. In this manner the front wheels and body are folded into the compact relation shown in Fig. 3; and that transpires while the rear wheels are being swung from the position shown in Fig. 1 through that shown in Fig. 2 to the compact relation shown in Fig. 3. Similarly, the handle bars 35, levers 44, arms 46 and the hood are folded from the position shown in Fig. 1 to that shown in Fig. 2 to the completely collapsed position shown in Fig. 3.

To erect the vehicle, the above described operations are reversed and when the handle bars and running gear have reached the position shown in Fig. 1, the sides 70 are erected by swinging transversely of the vehicle to the position shown and thereupon the clips 79 on the arms 46 are engaged with the button 78 on the sides. In the specific illustrative arrangement, the sides 70 are substantially rigid in the longitudinal direction of the vehicle and therefore when the button 78 is engaged with the clip 79, the arm 46 becomes in effect a strut interposed between the handle bar 35 and the longitudinal rigid side 70 so that the handle is held against any clockwise collapsing movement on its pivot 16. Similarly, the lever 44 is thus held or locked against collapsing movement and this, through the described chain of connecting elements, serves likewise to hold the entire running gear in fully erected position. The back 62 may be readily adjusted as described independently of the other parts and may be folded independently of the collapsing of the other parts.

It is to be understood that the invention is not limited to the specific construction, organization and mode of operation above described; on the contrary, the invention may be variously embodied and the described features may be used in various combinations and sub-combinations.

Claims:

1. A vehicle of the character described comprising, in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; sides connected to and foldable transversely of the latter; means connecting said sides and handles to hold said sides in erected position; and connections from said handles to said rear wheel carrier for collapsing the carriers and main frame on the rocking of the handles toward the front of the vehicle.

2. A vehicle of the character described comprising, in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; sides connected to and foldable transversely of the latter; a back foldable longitudinally of said main frame; and means coöperating with said handles for holding said sides in erected position.

3. A vehicle of the character described comprising, in combination, a main frame; front wheels; a carrier for the front wheels pivoted proximate the rear end of the frame and extending forwardly to a point near the front end of the frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; sides connected to and foldable transversely of the latter; a stop on the front wheel carrier; and connections from said handles to said rear wheel carrier for locking the latter against said stop on the rocking of said handles to erected position.

4. A vehicle of the character described comprising, in combination, a main frame; front wheels; a carrier for the front wheels pivoted to said frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; sides connected to and foldable transversely of the latter; and connections from said handles to said rear wheel carrier for automatically collapsing the carriers into overlapped relation with said main frame on the rocking of the handles toward the latter.

5. A vehicle of the character described comprising, in combination, a main frame; front wheels; a carrier for the front wheels pivoted to said frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; a member pivotally connected to said main frame and to said handles; a member pivotally connected to said main frame and to said rear wheel carrier; and a link connecting said members for transmitting movement from one to the other to collapse the vehicle on the rocking of said handles toward said main frame.

6. A vehicle of the character described comprising, in combination, a main frame; front wheels; a carrier for the front wheels pivoted to said frame, the axis of said pivot extending transversely of the frame, whereby the front wheels are foldable toward and from the frame; rear wheels; a carrier for the rear wheels pivoted to the carrier for the front wheels and foldable toward the front wheels; handles pivoted to said main frame; a hood; a member pivotally connected to said handles and hood; a member pivotally connected to said handles and main frame; said members having provision for supporting said hood independently of the sides of the vehicle and permit the gradual collapsing of said hood toward said main frame on the rocking of the handles toward the latter.

In testimony whereof, I have signed my name to this specification, in the presence of two subscribing witnesses.

GEORGE B. AMBLER.

Witnesses:
  GEO. H. ROUKES,
  GEO. P. HARTMAN.

Copies of this patent may be obtained for five cents each, by addressing the "Commissioner of Patents, Washington, D. C."